United States Patent [19]

Flindt et al.

[11] Patent Number: 4,679,722

[45] Date of Patent: Jul. 14, 1987

[54] METHOD AND APPARATUS FOR WELDING TWO PIPES ALONG THEIR LINE OF PENETRATION

[75] Inventors: Werner Flindt, Geesthacht; Hans Noll, Leverkusen, both of Fed. Rep. of Germany

[73] Assignee: Klöckner Wilhelmsburger GmbH, Geesthacht, Fed. Rep. of Germany

[21] Appl. No.: 806,633

[22] Filed: Dec. 9, 1985

[30] Foreign Application Priority Data

Dec. 8, 1984 [DE] Fed. Rep. of Germany ........ 3444820

[51] Int. Cl.$^4$ ............................................. B23K 31/00
[52] U.S. Cl. ...................................... 228/168; 228/48
[58] Field of Search .......................... 228/168, 102, 48; 219/125.11, 61, 60 R

[56] References Cited

U.S. PATENT DOCUMENTS 3,239,209 4/1966 Kucka .................................. 228/48
4,570,842 2/1986 Gregorious et al. ................. 228/48

FOREIGN PATENT DOCUMENTS 7207572 11/1972 Fed. Rep. of Germany .
2610576 9/1976 Fed. Rep. of Germany .
3313230 10/1984 Fed. Rep. of Germany .
883362 11/1961 United Kingdom ................ 228/168

Primary Examiner—Nicholas P. Godici
Assistant Examiner—Karen Skillman
Attorney, Agent, or Firm—Watson, Cole, Grindle & Watson

[57] ABSTRACT

A continuous and optimum weld is provided in the weld space between the attachment end of a secondary pipe and the outer surface of a primary pipe by means of a downwardly extending electric welding burner, the secondary pipe being oriented to extend at an angle to an imaginary central axis line extending through the primary pipe, by coordinating the vertical and horizontal positioning of the welding burner as the primary pipe is rotated, both around its imaginary central axis and end over end, so that the welding burner will be continuously aimed at the weld space and will operate at a constant current strength as the primary pipe rotates.

3 Claims, 3 Drawing Figures

METHOD AND APPARATUS FOR WELDING TWO PIPES ALONG THEIR LINE OF PENETRATION

BACKGROUND OF THE INVENTION

The present invention relates to a method and apparatus for welding two pipes along their line of penetration wherein, after cutting the line of penetration of the secondary pipe and taking into consideration the welding bevel (and, if necessary, after cutting the line of penetration of the primary pipe), both pipes are attached to one another and welded together.

THE PRIOR ART

Methods and devices for welding together primary and secondary pipes are known (see Prespectus of Kloeckner Opladen GmbH, "Stutzen-Einscheweissanlagen" (Installations for Welding Pipe Fittings). A known limitation of this known method is that it can be carried out only when the axis of the primary pipe and the axis of the secondary pipe intersect at an angle of 90°. To this end, the primary pipe is clamped into the chuck of a pendulum device whereby the secondary pipe is attached to the primary pipe. A rotating welding device is, for instance, flanged onto the secondary pipe and its welding burner basically moves along the line of penetration. In this case, the pendulum movements of the primary pipe and the movements of the welding burner are synchronized in such a way that welding occurs more or less along the trough line, which means that it is unavoidable in certain areas of the welding seam that welding occurs in an upward or downward direction. As such, the external outline of the welding bead alternates between being convex and concave. As a result, the electric current during the welding process cannot be held constant, which means that it is more widely dispersed, a fact that can greatly influence the quality of the welding seam at certain points. Tests have shown that controlling or regulating the intensity of the current with customary electronic devices is difficult and, in some cases, impossible. In such cases this type of welding connection cannot be used; for instance in the construction of reactors in which very narrow tolerances in the intensity of the current are prescribed for reasons of safety. That is also the reason why a measurement record is a required document for each welding seam. Basically, it is primarily required that the intensity of the current be held constant when the welding seams are subjected to extremely high loads. This is true, for instance, when welding connections for drilling platforms, refineries, pressurized containers and installations for the chemical and processing industry which are subjected to intense fluctuating loads.

Another serious disadvantage is present when the ratio of the diameter of the primary pipe to that of the secondary pipe has a value below 2.2, when in the angle positions of the pivoting angle of the welding device of 90° to 270°, the welding pool proceeds in such a way that smooth progress of the welding seam is impossible (the pivoting angle of the welding device measured in such a way that in—or against—the direction of the axis of the primary pipe the angle is defined as 0° or 180° respectively).

The present invention addresses the problem of providing a method for welding a primary pipe to at least one secondary pipe wherein the axes of the primary pipe and the secondary pipe can be in any desired position and wherein a welding seam is created which will satisfy the stringent restrictions of safety requirements.

SUMMARY OF THE INVENTION

According to the present invention a primary pipe and a secondary pipe can be welded together when their axes are positioned in any desired arrangement in relation to one another. According to the invention the primary pipe is revolved around its axis and is arranged to revolve and pivot toward the axis (end over end); the welding burner is guided in a plane above the primary pipe and vertically to it, a plane which runs parallel to the plane of the axis of the primary pipe when the pivoting angle is 90°; and that the movements of the primary pipe and the welding burner are coordinated in such a way that the momentary welding point traverses the peak of the welding seam to be created which corresponds to the line of penetration. The pivot angle is shown in FIG. 1 as angle $\gamma$.

Welding at the peak, in the sense of the invention, means that the welding seam is always placed in the position of the pool along the entire line of penetration. This happens, in accordance with the invention, as a result of the fact that the method, among other things, operates with more freedom than previously known methods. There is also the significant advantage that the intensity of the electric current during the welding process, in accordance with the invention, can surprisingly be held within much narrower tolerances than heretofore customary.

An apparatus for carrying out the method of the invention is characterized by the fact that it has a revolving-pivoting capability; that the frame of the revolving-pivoting device has a facility for clamping and rotating the primary pipe around its axis and that above the primary pipe there is a control means for guiding the welding burner on a plane; and that this control means has a capability for adjusting the height of the welding burner. As a result, it is possible to weld even primary pipes with large dimensions to several secondary pipes, and the secondary pipes can, simultaneously, become the primary pipe for other pipes. One primary area of application is for the so-called knots of drilling platforms which are subjected to extreme loads. The standards for drilling platforms require that the design of the welding bevels is in relation to the local dihedral angle $\psi$ (the dihedral angle is the angle enclosed at any given time by the tangential planes set by the separate points of the penetration curve.)

The features and advantages of the present invention will be better understood by reference to the attached drawings, taken in conjunction with the following discussion.

DETAILED DESCRIPTION OF THE PREFERRED EMBODIMENTS

Figure 1:
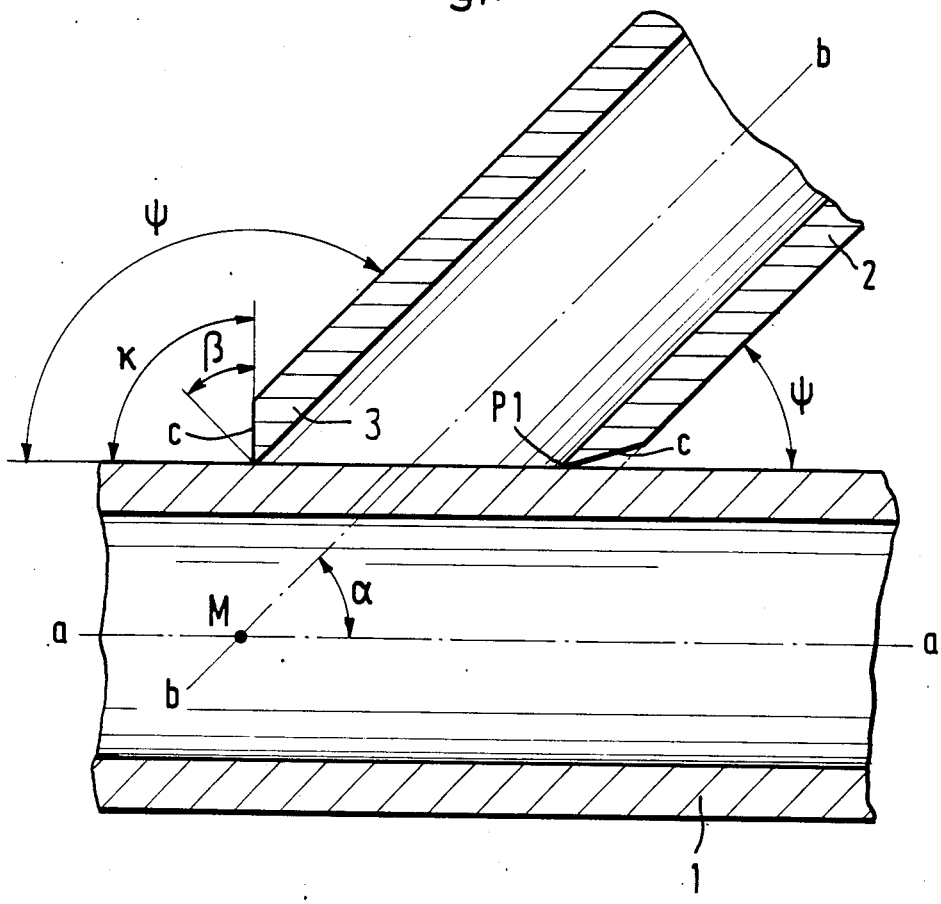
FIG. 1 shows an axial cross sectional view of a portion of a primary pipe and an end of a secondary pipe to be welded to the primary pipe in accordance with the method of the present invention.
Figure 2:
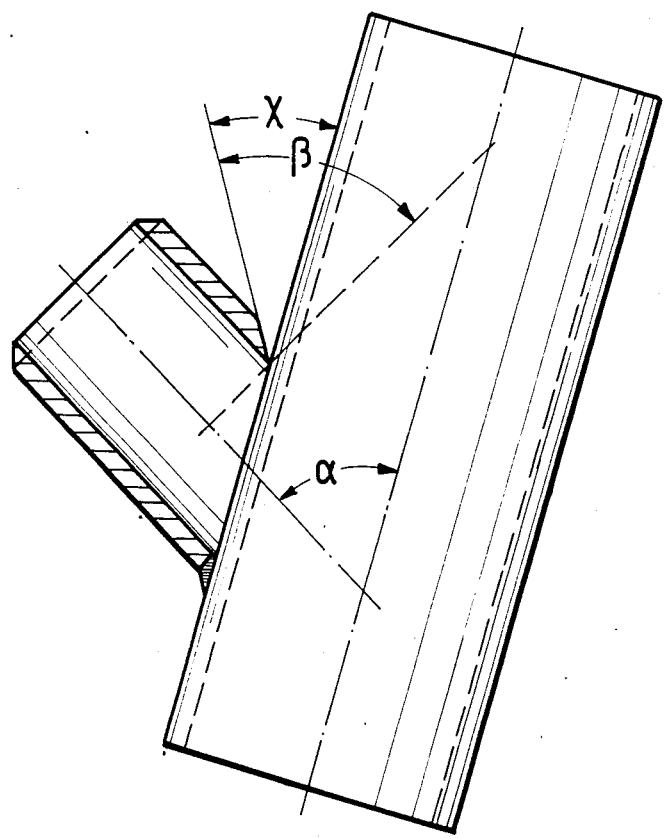
FIG. 2 shows, on a reduced scale, a side view of the primary pipe and a cross sectional view of the secondary pipe of FIG. 1, a portion of a weld being also indicated, and FIG. 3 schematically shows a side view of an apparatus for welding the secondary pipe to the primary pipe as shown in FIGS. 1 and 2.

Referring to FIG. 1, a primary pipe 1 is shown to define an imaginary central axis a—a and a secondary pipe 2 defines an imaginary central axis b—b, these two axes crossing at point M in the plane of projection (the axes a—a and b—b need not intersect, i.e., the axis b—b can extend at a given distance above or below the plane of projection). The angle between the two axes is shown as $\alpha$. The attachment end of the secondary pipe 2 is cut to conform to the line of penetration in the outer surface of the primary pipe and is beveled to have a welding surface c which, as is apparent, extends as a space oriented ribbon that is closed upon itself. Between the welding surface c and the outer surface of the primary pipe a welding space is formed. The dihedral angle $\psi$ is the angle between the tangential planes of the two pipes which, as shown in FIG. 1, is not constant. The angle $\beta$ is the angle between a radial line extending from the central axis b—b of the secondary pipe and the welding surface c. This angle $\beta$ is the pendulum angle for the flame cutter. The angle $\kappa$ is the angle between the tangential plane of the primary pipe and the welding bevel at the corresponding point on the penetration line of the secondary pipe. In accordance with established standards, proceeding with continuous welding along the line of penetration is not possible in the sectors where the angle is less than 15°. In these sectors the pendulum point P1 at the inside wall of the secondary pipe is continuously shifted in the direction of the outer shell of the secondary pipe so that a contact line remains intact as a crossing on the primary pipe 1.

Figure 3:
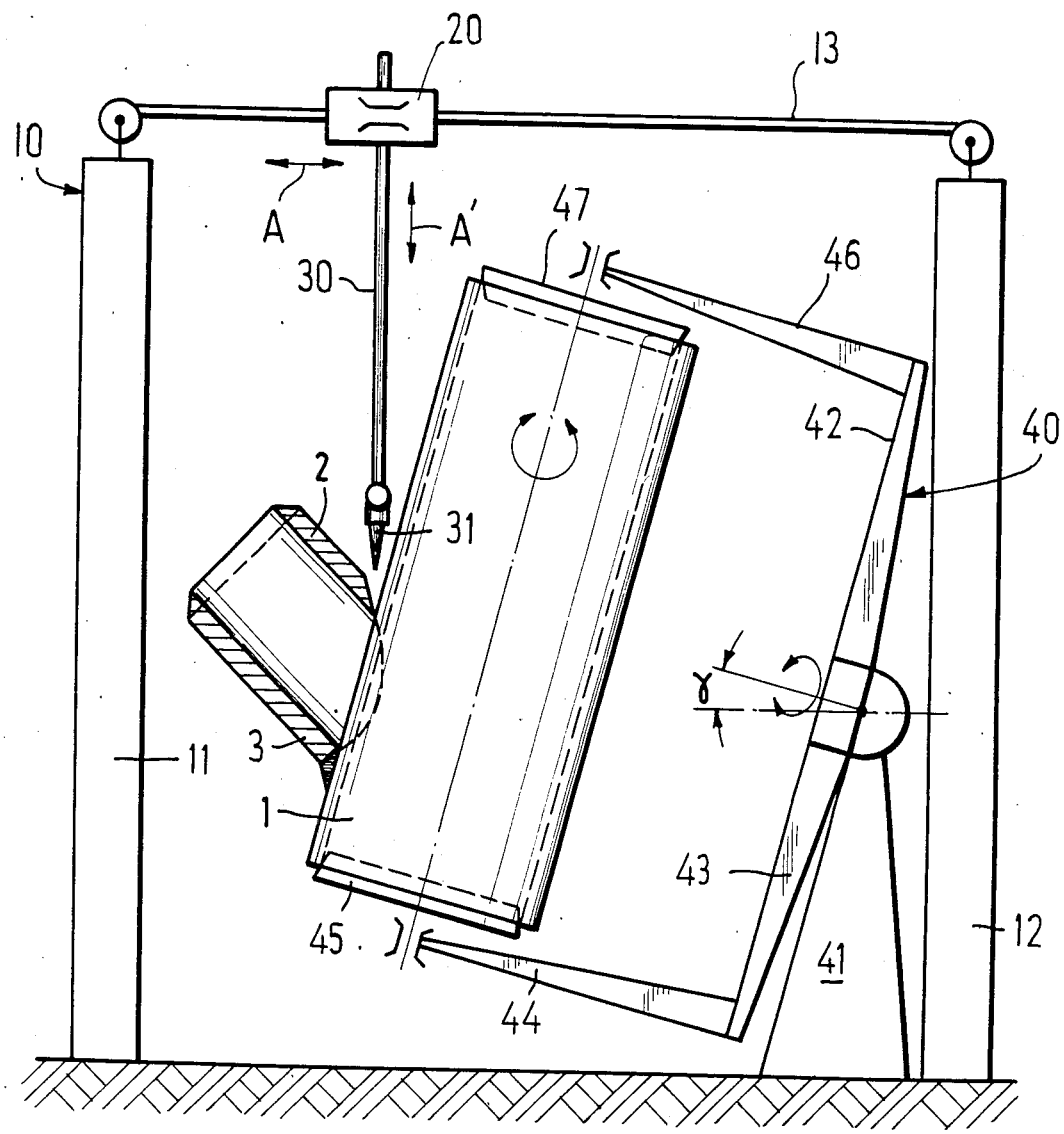

An apparatus for welding a secondary pipe to a primary pipe according to the present invention is schematically shown in FIG. 3. It includes a main frame 10 which includes two vertical support members 11 and 12 and a transverse (horizontal) support member 13 connected therebetween. A control member 20 is connected to the transverse support member 13 and is movable along its length as indicated by arrow A. A welding rod 30 having a welding burner 31 at its lower end is connected to the control member 20 and can be vertically moved by the control member 20 as indicated by arrow A'. A revolving-pivot device 40 is positioned within the main frame and includes a support pillar 41 rotating frame 42 which includes a base 43 and spaced apart support arms 44 and 46 extending away from the base 43, these support arms mounting jaws 45 and 47 at their ends for clamping the opposite ends of the primary pipe 1. As such, the primary pipe 1 can be simultaneously revolved around its imaginary central axis a—a and pivoted end over end. The revolving and pivoting movements of the primary pipe 1, resulting from operation of the revolving-pivoting device 40, are coordinated with the vertical and horizontal positioning of the welding burner 31, resulting from movement and operation of the control member 20, such that, during the welding process, the welding burner will always be downwardly aimed at the weld space, momentary welding point will be always at the peak and a continuous and optimum weld will be provided in the weld space.

Various modifications in the invention can be made and still fall within the scope of the following claims.

We claim:

1. A method of welding a secondary pipe to a primary pipe using a vertically-downwardly extending electric welding burner, the secondary pipe being welded to the primary pipe at an attachment point located between opposite ends of the primary pipe and such that the secondary pipe will extend at an angle $\alpha$ relative to an imaginary central axis which extends through the primary pipe, the method comprising the steps of (1) cutting an attachment end of said secondary pipe such that the contour thereof generally conforms to the contour of the outer surface of said primary pipe along a line of penetration of said secondary pipe in the outer surface of said primary pipe at said attachment point, (2) beveling the attachment end of said secondary pipe so that when the attachment end of said secondary pipe is positioned against the outer surface of said primary pipe at said attachment point, a continuous welding space will be provided therebetween, (3) positioning said secondary pipe relative to said primary pipe such that the attachment end of said secondary pipe abuts the outer surface of said primary pipe at said attachment point, (4) positioning both said primary pipe and said secondary pipe such that the downwardly-extending electric welding burner will be aimed at the welding space therebetween, (5) initiating operation of said welding burner, and (6) rotating said primary pipe about its imaginary axis, rotating said primary pipe end over end and moving said primary pipe about a horizontal axis spaced therefrom, while simultaneously moving said welding burner vertically upwardly and downwardly and horizontally, so that said welding burner will continuously aim into said weld space as said primary pipe is rotated and will operate at a constant current strength, thus providing a continuous and optimum weld in said weld space.

2. A method according to claim 1, wherein in step (2) the attachment end of said secondary pipe is beveled to provide a welding surface having a space-oriented ribbon configuration that is closed upon itself.

3. An apparatus for welding a secondary pipe to a primary pipe such that an attachment end of the secondary pipe will be connected to the primary pipe at an attachment point located between opposite ends of the primary pipe and such that the secondary pipe will extend at an angle $\alpha$ relative to an imaginary central axis line that extends through the primary pipe, said apparatus comprising a main frame which includes a plurality of vertical support members and a horizontal support member, said horizontal support member defining an imaginary horizontal plane, a control member which is mounted on said horizontal support member so as to be movable in said imaginary horizontal plane, said control member being capable of supporting an elongated welding member which extends vertically downwardly therefrom, said control member also being capable of adjusting the vertical positioning of said elongated welding member, an elongated welding member connected to said control member to extend vertically downwardly therefrom, said welding member having a welding burner at a lower end thereof, and a revolving-pivoting device positioned between the vertical support members and below the horizontal support member of said main frame, said revolving-pivoting device including a support pillar and a frame means, said frame means including a base element and two spaced apart support arms extending away from said base element, said support arms respectively including mounting means for mounting the opposite ends of said primary pipe and enabling said primary pipe to rotate about its imaginary central axis, said frame means defining an imaginary central axis therethrough, and said base being attached to said support pillar such that it can pivot about a horizontal axis and also rotate around the imaginary central axis of said frame means, said apparatus, when a primary pipe is positioned between the mounting means on the support arms of the revolving-pivoting device and the attachment end of a secondary pipe, which is oriented at an angle α with respect to an imaginary central axis line of the primary pipe, is positioned against the outer surface of the primary pipe, enabling the welding burner to be continuously aimed at the welding space between the attachment end of the secondary pipe and the outer surface of the primary pipe by coordinating the vertical and horizontal movement of the welding burner, due to movement and operation of the control member, with rotation of the primary pipe around its central axis line, rotation of the primary pipe end over end and pivoting of the primary pipe about said horizontal axis, due to operation of the revolving-pivoting device.

* * * * *